US009005396B2

(12) United States Patent
Baroux

(10) Patent No.: US 9,005,396 B2
(45) Date of Patent: Apr. 14, 2015

(54) METHOD FOR FORMING A FIRE RESISTANT CELLULOSE PRODUCT, AND ASSOCIATED APPARATUS

(75) Inventor: Daniel Baroux, Nanaimo (CA)

(73) Assignee: BLH Technologies Inc., Halifax, Nova Scotia (CA)

(*) Notice: Subject to any disclaimer, the term of this patent is extended or adjusted under 35 U.S.C. 154(b) by 0 days.

(21) Appl. No.: 13/821,517

(22) PCT Filed: Sep. 7, 2010

(86) PCT No.: PCT/CA2010/001353
§ 371 (c)(1),
(2), (4) Date: May 20, 2013

(87) PCT Pub. No.: WO2012/031345
PCT Pub. Date: Mar. 15, 2012

(65) Prior Publication Data
US 2013/0292077 A1 Nov. 7, 2013

(51) Int. Cl.
*D21J 1/16* (2006.01)
*B32B 5/26* (2006.01)
(Continued)

(52) U.S. Cl.
CPC ... *D21J 1/16* (2013.01); *B32B 5/26* (2013.01); *B32B 21/02* (2013.01); *B32B 21/10* (2013.01); *B32B 29/02* (2013.01); *C08G 18/6484* (2013.01); *C08G 18/7671* (2013.01); *C09K 21/14* (2013.01); *D21C 5/02* (2013.01); *D21H 21/34* (2013.01); *C08L 1/02* (2013.01); *C08L 97/02* (2013.01); *B32B 2250/03* (2013.01); *B32B 2250/20* (2013.01); *B32B 2260/021* (2013.01); *B32B 2260/046* (2013.01);
(Continued)

(58) Field of Classification Search
CPC ............. D21J 1/16; D21C 5/02; D21H 21/34; B32B 5/26; B32B 21/10; B32B 29/02; B32B 21/02
See application file for complete search history.

(56) References Cited

U.S. PATENT DOCUMENTS 3,770,577 A 11/1973 Humphrey
4,708,910 A 11/1987 Forss
(Continued)

FOREIGN PATENT DOCUMENTS

WO WO 96/24486 A1 8/1996

OTHER PUBLICATIONS

"Laminating Composite Panels", Composite Panel Association, Technical Bulletin, 2007, pp. 1-27.

*Primary Examiner* — Jacob Thomas Minskey
(74) *Attorney, Agent, or Firm* — Womble Carlyle Sandridge & Rice, LLP

(57) ABSTRACT

A method is provided for forming a fire resistant cellulose product. A fire-retarding solution and a bonding agent are combined with refined cellulose fibers to form a fiber mixture, and the fire-retarding solution and bonding agent are substantially uniformly distributed with respect to the cellulose fibers within the fiber mixture. The fiber mixture is exposed to an actuating element, wherein the actuating element is configured to actuate the bonding agent so as to facilitate cohesion of the cellulose fibers and form the fiber mixture into a fiber board member, the fiber board member having opposing major surfaces. A cellulose sheet member is engaged with each major surface of the fiber board member, such that each cellulose sheet member substantially covers the respective major surface. An associated apparatus is also provided.

11 Claims, 3 Drawing Sheets

Figure 1:
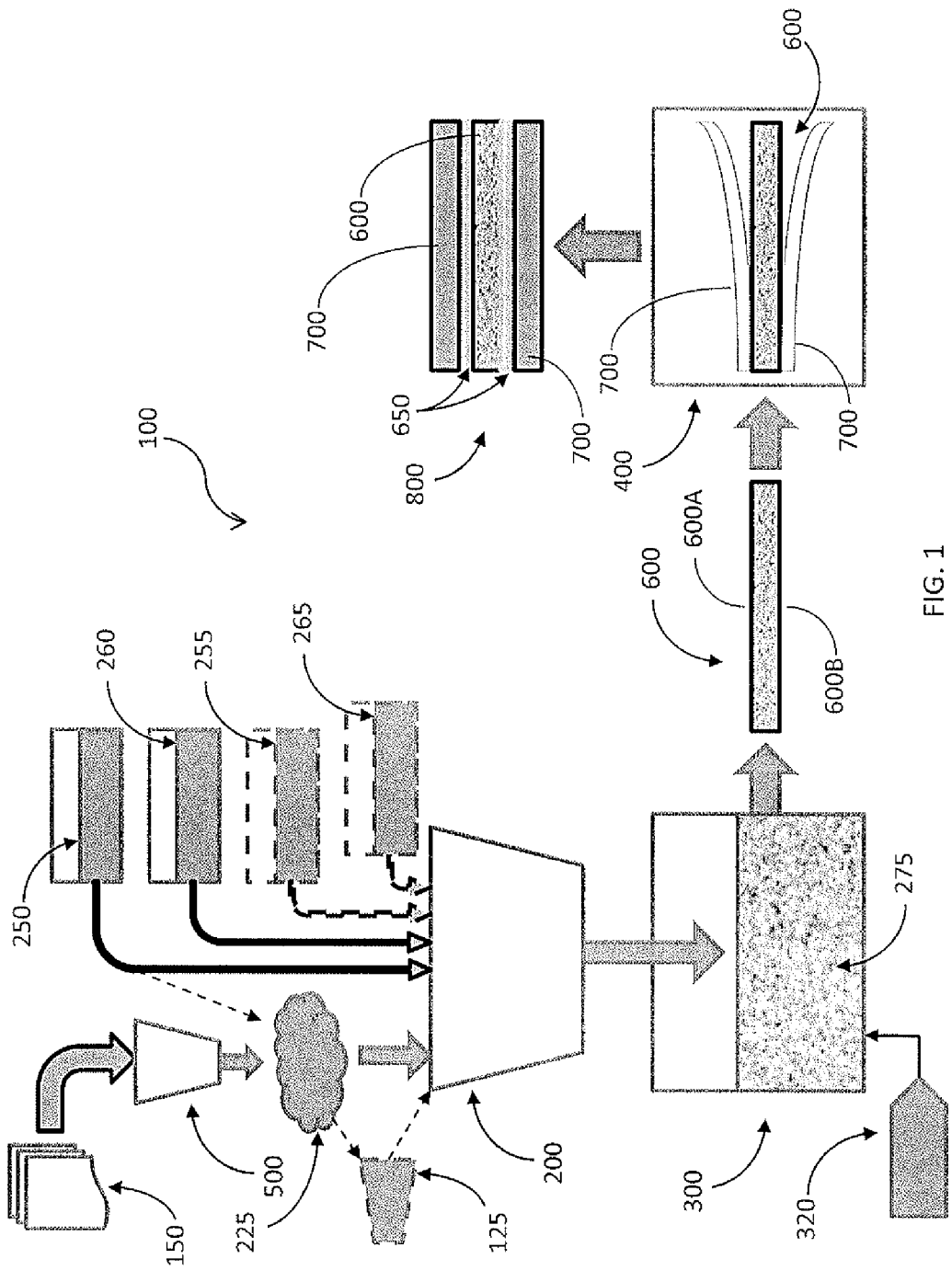

(51) Int. Cl.
*B32B 21/02* (2006.01)
*B32B 21/10* (2006.01)
*B32B 29/02* (2006.01)
*C08G 18/64* (2006.01)
*C08G 18/76* (2006.01)
*C09K 21/14* (2006.01)
*D21C 5/02* (2006.01)
*D21H 21/34* (2006.01)
*C08L 1/02* (2006.01)
*C08L 97/02* (2006.01)

(52) U.S. Cl.
CPC ...... *B32B 2262/04* (2013.01); *B32B 2262/062* (2013.01); *B32B2262/067* (2013.01); *B32B 2262/14* (2013.01); *B32B 2307/3065* (2013.01); *B32B 2317/12* (2013.01); *B32B 2317/16* (2013.01); *B32B 2317/18* (2013.01); *B32B 2607/00* (2013.01); *C08L 2201/02* (2013.01); *C08L 2205/16* (2013.01)

(56) References Cited

U.S. PATENT DOCUMENTS

| | | |
|---|---|---|
| 5,171,366 A | 12/1992 | Richards et al. |
| 5,305,577 A | 4/1994 | Richards et al. |
| 5,401,588 A | 3/1995 | Garvey et al. |
| 5,723,226 A | 3/1998 | Francis et al. |
| 5,945,208 A | 8/1999 | Richards et al. |
| 6,676,744 B2 | 1/2004 | Merkley et al. |
| 6,886,306 B2 | 5/2005 | Churchill et al. |
| 7,534,827 B2 | 5/2009 | Okoshi et al. |
| 2004/0251446 A1 | 12/2004 | Mantanis |
| 2008/0171231 A1 | 7/2008 | Lopez et al. |
| 2009/0152519 A1 | 6/2009 | Francis |

METHOD FOR FORMING A FIRE RESISTANT CELLULOSE PRODUCT, AND ASSOCIATED APPARATUS

BACKGROUND OF THE DISCLOSURE

1. Field of the Disclosure

Aspects of the present disclosure relate to methods for forming fire resistant products, and, more particularly, to a method for forming a fire resistant cellulose product, such as a wallboard, and associated apparatus.

2. Description of Related Art

It may sometimes be desirable for particular products to exhibit resistance to fire. For example, it may be desirable for paperboard products used in building construction to exhibit a certain degree of fire resistance. In the case of drywall, which generally comprises a gypsum core with paperboard facing sheets, it is the gypsum core, and not the paperboard facing sheets, which is relied upon to provide some fire resistance capabilities. However, since drywall is comprised of two different materials, it may be difficult and/or relatively expensive to produce. Further, the fire resistance capabilities of drywall may not necessarily be enough to make a significant difference in the overall construction of the building.

One significant impediment to implementing cellulose products on a widespread basis is the risk of fire. That is, though cellulose products may be implemented in many different applications, those applications may be precluded by the apparent lack of fire resistance provided by such cellulose products. In some instances, a paperboard product may have a fire-retardant product applied thereto, post-formation, to provide some fire resistance capabilities for the paperboard product. That is, an exemplary as-formed paperboard product may have a surface treatment, for example, a liquid fire retardant, applied thereto in order for the treated product to exhibit at least some fire resistance. In such cases, however, one possible limitation in the treatment of the as-formed paperboard product for fire resistance, particularly with a liquid fire retardant, is achieving an even and consistent treatment of that product. More particularly, the result of some fire resistance treatment processes involving application of a liquid fire-retardant to an as-formed paperboard product may be an uneven or otherwise inconsistent coverage of the fire retardant with respect to the product. In those instances, the uneven treatment may result in varying levels of fire resistance of the treated paperboard product which may, in turn, become a hazard in the event of a fire, which the product is intended to retard or otherwise provide some resistance against. Further, such treatment processes may not necessarily be efficient in terms of applying the fire retardant to the paperboard product.

In addition, even with as-formed cellulose products treated with a liquid fire retardant, the treated product may not necessarily be heat resistant. That is, even if the as-formed cellulose product, treated with a liquid fire retardant, were to be locally fire resistant, the associated heat may break down the cellulose and allow the fire to penetrate the product.

Thus, there exists a need for a process and associated apparatus for evenly and consistently applying a fire retardant, particularly a liquid fire retardant, to a cellulose product such as, for example, a paperboard product and/or a fiber board product. In some instances, it may also be desirable to form a cellulose product (i.e., wallboard) having the characteristics of an existing product having two or more discrete components (i.e., drywall), while also providing an enhanced level of fire resistance.

BRIEF SUMMARY OF THE DISCLOSURE

The above and other needs are met by aspects of the present disclosure, wherein one such aspect relates to a method of forming a fire resistant cellulose product. Such a method comprises combining a fire-retarding solution and a bonding agent with refined cellulose fibers to form a fiber mixture, wherein the fire-retarding solution and the bonding agent are substantially uniformly distributed with respect to the cellulose fibers within the fiber mixture. The fiber mixture is exposed to an actuating element, wherein the actuating element is configured to actuate the bonding agent so as to facilitate cohesion of the cellulose fibers and to form the fiber mixture into a fiber board member, with the fiber board member having opposing major surfaces. A cellulose sheet member is engaged with each of the major surfaces of the fiber board member, such that each cellulose sheet member substantially covers the respective major surface.

Another aspect of the present disclosure relates to an apparatus for forming a fire resistant cellulose product. Such an apparatus comprises a mixing device configured to combine a fire-retarding solution and a bonding agent with refined cellulose fibers to form a fiber mixture, with the fire-retarding solution and the bonding agent being substantially uniformly distributed with respect to the cellulose fibers within the fiber mixture. A first processing device is configured to expose the fiber mixture to an actuating element, wherein the actuating element is configured to actuate the bonding agent so as to facilitate cohesion of the cellulose fibers and to form the fiber mixture into a fiber board member, with the fiber board member having opposing major surfaces. A second processing device is configured to engage a cellulose sheet member with each of the major surfaces of the fiber board member, such that each cellulose sheet member substantially covers the respective major surface.

In some aspects, a mixture, comprising at least the fire-retarding solution and the cellulose fibers, may be dried, for example, by a drying device, prior to exposing the fiber mixture to the actuating element. In other aspects, the fiber mixture may be deposited into a mold arrangement, prior to the fiber mixture being exposed to the actuating element, wherein the mold arrangement is configured to receive the fiber mixture and to facilitate exposure of the fiber mixture to the actuating element.

The bonding agent may comprise one of a resin and a wax. In some instances, the bonding agent may comprise a methylene diphenylene diisocyanate (MDI) bonding material. The actuating element may comprise one of heat, heated humid air, steam, microwave energy, and infrared energy. Once formed, the fiber board member may include between about 2% and about 30% solids content of each of the fire-retarding solution and the bonding agent.

In some aspects, a refining device may be configured to refine one of raw wood pulp, palm tree waste, waste fiber, waste paper, and waste board, into the cellulose fibers for inclusion in the fiber mixture. The fire-retarding solution may comprise one of a boron compound, a borate, an inorganic hydrate, a bromine compound, aluminum hydroxide, magnesium hydroxide, hydromagnesite, antimony trioxide, a phosphonium salt, ammonium phosphate, diammonium phosphate, and combinations thereof. Generally, the fire-retarding solution may comprise one of an aqueous fire-retarding solution, a nontoxic liquid fire-retarding solution, and a neutral pH liquid fire-retarding solution. That is, in particular aspects, the fire-retarding solution may be an aqueous fire-retarding solution, or it may be preferred that the fire-retarding solution be nontoxic and/or have a neutral pH and/or be hypoallergenic and/or have any number of otherwise desirable properties.

The cellulose sheet member may comprise one of an encasement paper sheet member, a medium density fiber (MDF) board sheet member, and an oriented strand board (OSB) sheet member. A cellulose sheet member may be engaged with each of the major surfaces of the fiber board member with one of a resin material and an adhesive material disposed between each cellulose sheet member and the corresponding major surface.

In some aspects, one of a mold inhibitor and an insect deterrent may be added to the fiber mixture prior to exposing the fiber mixture to an actuating element. The insect deterrent may comprise one of glass particles and a borate substance, for providing a termite deterrent.

Aspects of the present disclosure thus address the identified needs and provide other advantages as otherwise detailed herein.

BRIEF DESCRIPTION OF THE SEVERAL VIEWS OF THE DRAWING(S)

Figure 2:
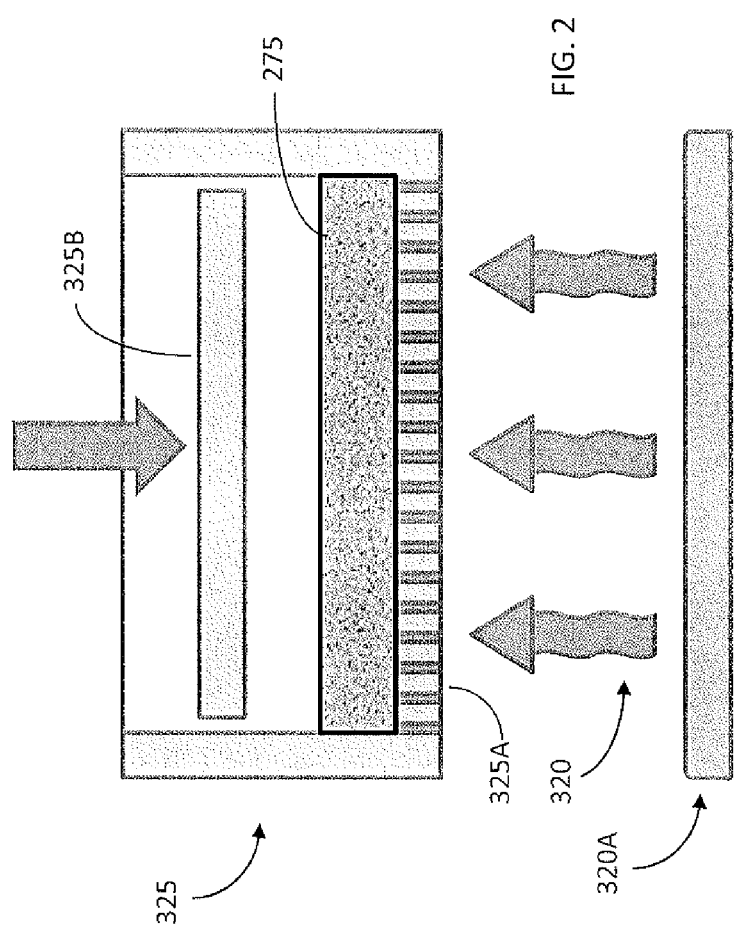
Figure 3:
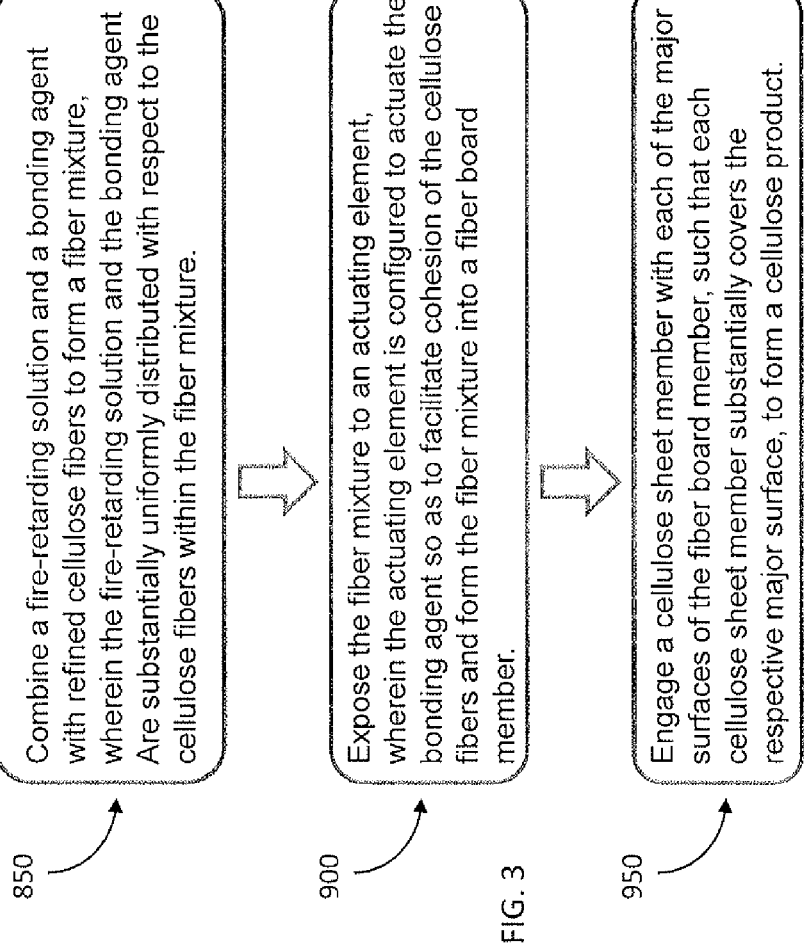

Having thus described the disclosure in general terms, reference will now be made to the accompanying drawings, which are not necessarily drawn to scale, and wherein:

FIG. 1 schematically illustrates an apparatus for forming a fire resistant cellulose product, according to one aspect of the disclosure;

FIG. 2 schematically illustrates a processing device comprising a mold arrangement, according to one aspect of the disclosure; and FIG. 3 schematically illustrates a method of forming a fire resistant cellulose product, according to one aspect of the disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to apparatuses and methods for forming a fire resistant cellulose product, such as a wallboard. One significant impediment to implementing cellulose products on a widespread basis is the risk of fire. That is, though cellulose products may be implemented in many different applications, those applications may be precluded by the apparent lack of fire resistance provided by such cellulose products. Further, as previously discussed, one possible limitation in the treatment of as-formed cellulose products, such as a paperboard product, for fire resistance, particularly with a liquid fire retardant, is achieving an even and consistent treatment of that cellulose product. More particularly, the result of some fire resistance surface-treatment processes may be an uneven or otherwise inconsistent application of the fire retardant to the cellulose product. In those cases, such uneven surface treatment may result in varying levels of fire resistance of the treated cellulose product which may, in turn, become a hazard in the event of a fire which the product is intended to retard or otherwise provide some resistance against. In addition, even if such as-formed cellulose products were to be treated with a liquid fire retardant, the treated product may not necessarily be heat resistant (i.e., may not provide a thermal barrier in case of fire). That is, even if the as-formed cellulose product, treated with a liquid fire retardant, were to be locally fire resistant, the associated heat may break down the cellulose and allow the fire to penetrate the product.

As such, one aspect of the present disclosure involves an apparatus for forming a fire-resistant cellulose product, such as a wallboard, with such an apparatus being indicated as element 100 in FIG. 1. Such an apparatus 100 may comprise, for example, a mixing device 200 configured to combine a fire-retarding solution 250 and a bonding agent 260 with refined cellulose fibers 225 so as to form a fiber mixture 275, wherein the fire-retarding solution 250 and the bonding agent 260 are substantially uniformly distributed with respect to the cellulose fibers 225 within the fiber mixture 275 (see, also, block 850 of FIG. 3). A first processing device 300 is configured to expose the fiber mixture 275 to an actuating element 320, wherein the actuating element 320 is configured to actuate the bonding agent 260 so as to facilitate cohesion of the cellulose fibers 225 and to form the fiber mixture 275 into a fiber board member 600, with the fiber board member 600 having opposing major surfaces 600A, 600B (see, also, block 900 of FIG. 3). A second processing device 400 is configured to engage a cellulose sheet member 700, which may or may not be fire-retardant, with each of the major surfaces 600A, 600B of the fiber board member 600, such that each cellulose sheet member 700 substantially covers the respective major surface 600A, 600B (see, also, block 950 of FIG. 3).

In some aspects, the apparatus 100 may also include a refining device 500 configured to process/refine cellulose materials from one or more sources 150 into suitable refined cellulose fibers 225 for the fiber mixture 275. That is, aspects of the present disclosure contemplate that the resultant cellulose products or components thereof may be comprised of recycled cellulose fibers (i.e., from raw wood pulp, palm tree waste, waste paper, waste board, waste paperboard, or any other suitable waste source of cellulose fibers, already used to form a product and suitable for recycling). However, one skilled in the art will appreciate that raw, original, or otherwise virgin cellulose fibers may also be used in addition to, in combination with, or instead of the recycled/waste cellulose fibers. For example, sawmill waste and/or empty fruit baskets/bunches from palm trees or other palm tree waste may be suitable sources of previously unprocessed cellulose fibers for refining, as necessary, for the fiber mixture 275. Further, in some aspects, the cellulose fibers may not necessarily be required to be free of contaminants, as long as those contaminants can be processed/refined along with the cellulose material to refine the cellulose fibers into a form suitable for the fiber mixture 275. As such, a decontamination process may not necessarily be contemplated, but could be included, should there be a need or desire for a contaminant-free fiber mixture for inclusion in the cellulose product. The extent of the processing/refining of the cellulose materials may vary considerably depending, for example, on the level of refinement (i.e., coarse/fine) desired of the fiber mixture and/or the final cellulose product. The refining device 500 may be any machine suitable for deconstructing the cellulose raw materials in the manner discussed, wherein one such exemplary machine may be manufactured by Siempelkamp of Dusseldorf, Germany.

Once the cellulose raw materials are refined into the desired state (i.e., coarse/fine) by the refining device 500, the refined cellulose fibers 225 may be directed to the mixing device 200, where the refined cellulose fibers 225 are mixed with a fire-retarding solution 250 and a bonding agent 260 to form a fiber mixture 275. The mixing device 200 is configured to mix the cellulose fibers 225, the fire-retarding solution 250, and the bonding agent 260, such that the fire-retarding solution 250 and the bonding agent 260 are substantially uniformly distributed with respect to the cellulose fibers 225 within the fiber mixture 275. In some instances, the mixing device 200 may be configured to add and/or receive other appropriate substances/materials/chemicals for addition to the fiber mixture 275. For example, the mixing device 200 may be configured to receive a mold inhibitor 255 for addition to the fiber mixture 275. In other instances, the mixing device 200 may be configured to receive a water repellant, waterproofing, or otherwise water resistant substance (not shown) for incorporation into the fiber mixture 275 such that the end product exhibits water-resistive properties. In yet other instances, the mixing device 200 may be configured to receive an insect-deterrent 265 for addition to the fiber mixture 275. Such an insect deterrent may comprise, for example, glass particles, glass fibers, glass slivers, glass shards, or any other suitable forms of glass elements, and/or a borate substance, so as to provide a termite deterrent. In any instance, it may be preferable that any additional substances received into the fiber mixture 275 be suitably processed by the mixing device 200 so as to be substantially uniformly distributed within the fiber mixture 275. Also, in some aspects, a mixture including at least the fire-retarding solution 250 and the cellulose fibers 225 may be dried, for example, by a drying device 125, as shown in FIG. 1, prior to the fiber mixture 275 being exposed to the actuating element 320. The is, the cellulose fibers 225 may be dried, particularly upon the fire-retarding solution 250 being introduced thereto, though the bonding agent 260 is not necessarily a component of the mixture. One skilled in the art will appreciate, however, that the fiber mixture 275 including both the fire-retarding solution 250 and the bonding agent 260 may be dried by the drying device 125, as necessary or desired.

In particular aspects, the fire-retarding solution 250 may be an aqueous fire-retarding solution. It may be preferred that the fire-retarding solution be nontoxic and/or have a neutral pH and/or be hypoallergenic and/or have any number of otherwise desirable properties affecting human/animal and/or environmental safety, while maintaining the necessary efficacy, as implemented and upon exposure to heat and/or flame. In some aspects, the fire-retarding solution 250 may comprise any one of a boron compound, a borate, an inorganic hydrate, a bromine compound, aluminum hydroxide, magnesium hydroxide, hydromagnesite, antimony trioxide, a phosphonium salt, ammonium phosphate, and diammonium phosphate, or various combinations thereof. In this regard, one skilled in the art will appreciate that various fire-retarding or fire resistant substances, either currently known or later developed or discovered, may be applicable to the disclosed processes and apparatuses herein within the scope of the present disclosure. One skilled in the art will further appreciate that the fire-retarding solution may be formed by adding a solid fire-retardant product to a liquid (i.e., water) or other chemical. In some instances, the mixing device 200 may be configured to agitate the fiber mixture 275, so as to facilitate the substantially uniformly distribution of the fire-retarding solution and/or the bonding agent therethrough. The mixing device 200 may be any machine suitable for combining the noted components, whether required or optional, into the fiber mixture 275, in the manner discussed, wherein one such exemplary machine may be manufactured by Siempelkamp of Dusseldorf, Germany.

The first processing device 300 is configured to receive the fiber mixture 275 from the mixing device 300 and to expose the fiber mixture 275 to an actuating element 320, wherein the actuating element is configured to actuate the bonding agent 260 so as to facilitate cohesion of the cellulose fibers 225 and to form the fiber mixture 275 into a fiber board member 600. In this regard, the bonding agent 260 may comprise a resin and/or a wax material. In some instances, the bonding agent 260 may comprise a methylene diphenylene diisocyanate (MDI) bonding material. Accordingly, the actuating element 320 may preferably be configured to promote actuation of the bonding agent 260, in order for the bonding agent 260 to exhibit the necessary efficacy for facilitating cohesion between the cellulose fibers 225 within the fiber mixture 275. In this regard, in instances involving a heat-actuated bonding agent, the actuating element 320 may comprise, for example, one of heat, heated air (i.e., heated with combusted natural gas or other suitable fuel source), heated humid air, steam, microwave energy, and/or infrared energy, as will be appreciated by one skilled in the art. One such exemplary process for forming a fiber board member is disclosed, for example, in International Patent Application No WO 2010/022864 to Siempelkamp, though such a process does not disclose any incorporation of a fire-retarding substance in the end product, and does not address the associated issues of fire resistance or thermal resistance to fire/heat.

Once actuated by the actuating element 320 to facilitate cohesion between the cellulose fibers 225, the bonding agent 260 may also promote some desirable characteristics exhibited by the fiber board member 600 such as, for example, a degree of water resistance (i.e., reduced or eliminated "swelling" of the fiber board member 600 if the fiber board member 600 is exposed to water).

Further, in some instances, the first processing device 300 may comprise a mold arrangement 325 (see, e.g., FIG. 2) configured to receive the fiber mixture 275, prior to the fiber mixture 275 being exposed to the actuating element 320, wherein the mold arrangement 325 may be further configured to facilitate exposure of the fiber mixture 275 to the actuating element 320. For example, where the actuating element 260 comprises steam or heated humid air, the mold arrangement 325 may include a porous element 325A having an actuating element source 320A in communication therewith. Once the fiber mixture 275 is deposited in the mold arrangement 325, the actuating element 320 from the actuating element source 320A may be directed thereto so as to enter the mold arrangement 325 through the porous element 325A so as to interact with the fiber mixture 275 therein. Permeation of the actuating element 320 through the fiber mixture 275 actuates the bonding agent 260 to facilitate cohesion/adhesion of the cellulose fibers 225 within the fiber mixture 275 to form the fiber board member 600. In some aspects, the mold arrangement 325 may further include a pressure application aspect for applying a pressure to the fiber mixture 275 while the fiber mixture 275 is exposed to the actuating element 320. For example, the mold arrangement 325 may comprise an "open top" container (i.e., porous element 325A) for receiving the fiber mixture 275, wherein the container is configured to receive a weighted, floating platen 325B for applying pressure to the fiber mixture 275, while the actuating element 320 is applied thereto. In such instances, the extent of the compression of the fiber mixture 275, and thus the density of the resulting fiber board member 600, may be determined, as necessary or desired. In other instances, the first processing device 300 may comprise any other suitable press or pressure application device such as, for example, a ContiPress continual press device manufactured by Siempelkamp. Accordingly, one skilled in the art will appreciate that the density of the fiber board member 600 may vary considerably, as necessary or desired.

Once formed, the fiber board member 600 may desirably include between about 2% and about 30% solids content of each of the fire-retarding solution 250 and the bonding agent 260. That is, particular aspects of the disclosure require the combination of a suitable amount of the fire-retarding solution 250 with the bonding agent 260 and the cellulose fibers 225 (and the optional mold inhibitor and/or insect deterrent components) such that the total solids content of each of the fire-retarding solution 250 and the bonding agent 260 within the resulting fiber mixture 275/fiber board member 600 is between about 2% and about 30%. In some instances, the amount of the fire-retarding solution 250 incorporated into the fiber mixture 275 may desirably be correlated with the extent of the fire resistance and/or thermal barrier properties exhibited by the fiber board member 600.

In addition, once formed, the fiber board member 600 may be defined by opposing major surfaces 600A, 600B. The opposing major surfaces 600A, 600B, as formed, may each be substantially planar. In some instances, should the opposing major surfaces 600A, 600B not be substantially planar, the fiber board member 600 may be processed by a planer device (not shown) configured to process the fiber board member 600 to render opposing major surfaces 600A, 600B into a substantially planar configuration.

The second processing device 400 may be configured to receive the fiber board member 600, in some instances, directly from the first processing device 300 (in some other instances, after the fiber board member 600 is processed by the planer device), and to engage a cellulose sheet member 700 with each of the major surfaces 600A, 600B of the fiber board member 600. The cellulose sheet member 700 may comprise, for example, an encasement paper sheet member, a medium density fiber (MDF) board sheet member, and an oriented strand board (OSB) sheet member. In some particular instances, the cellulose sheet member 700 may be comprised of cellulose fibers similar to or substantially the same as the cellulose fibers comprising the fiber mixture 275. In other particular instances, the cellulose sheet member 700 may also comprise the same or substantially similar fire-retarding solution 250 and, optionally, the same or substantially similar bonding agent 260, as the fiber mixture 275. In some desirable aspects, the cellulose sheet member 700 is treated with and incorporates a fire-retarding solution, whether or not the fire-retarding solution is the same as incorporated into the fiber board member 600. That is, the cellulose sheet member 700 may not necessarily be treated with the fire-retarding solution, though such treatment may be preferable. In any instance, the cellulose sheet member 700, when engaged with the fiber board member 600, may facilitate, contribute to, enhance, or otherwise provide structural properties (i.e., tensile strength, bending resistance, impact resistance, etc.) for the fiber board member 600, particularly if engaged with both major surfaces 600A, 600B thereof. Such structural enhancement may be more apparent in instances of the fiber board member 600 being relatively thin. Further, the cellulose sheet member 700 may provide a suitable surface for the resulting product, for accepting paints, stains, or other surface treatment for enhancing the aesthetic properties of the end product. One skilled in the art will appreciate, however, that though the sheet member 700 is referred to herein as being comprised of a cellulose material, any other suitable material exhibiting the desired properties disclosed herein may also be desirable and capable of being implemented within the scope of the present disclosure.

The cellulose sheet member 700 may, in some aspects, be applied to the respective major surface 600A, 600B of the fiber board member 600 with a resin material and/or an adhesive material (generally designated as element 650) disposed between each cellulose sheet member 700 and the corresponding major surface 600A, 600B, and the second processing device 400 may be appropriately configured to apply the same, in addition to assembling the cellulose sheet members 700 with the fiber board member 600. The fiber board member 600 having the cellulose sheet members 700 engaged therewith in the disclosed manner thus forms a fire resistant cellulose product 800 which may be implemented, in some exemplary aspects, as a wallboard product capable of being used in a construction process. In some particular instances, a cellulose wallboard product formed according to the disclosure may have structural properties of conventional drywall (gypsum core with paperboard facing sheets), but may exhibit less weight. According to some aspects, the weight difference advantage (less weight) of the cellulose wallboard product according to the disclosure over that of conventional gypsum-based drywall may be considerable.

Further, in some aspects, a cellulose product 800 formed in accordance with aspects of the present disclosure may also exhibit other desirable and enhanced properties over those of conventional gypsum-based drywall. For example, such cellulose products 800 may exhibit "zero ignition" and/or "zero flame spread," particularly if the cellulose sheet members 700 are treated with the fire-retarding solution 250 (i.e., as opposed to merely controlling flame spread, as in the case of a surface treatment of a product with a fire retardant). In another example, treatment of the fiber board member 600 with the fire-retarding solution 250 a more uniform and thorough dispersion and distribution of the fire-retarding solution 250 within the product, thus enhancing fire resistance (flame spread), as well as thermal barrier (thermal resistance/insulation) characteristics.

An end product configured as a wallboard product may be, for example, substantially planar, with a thickness of between about 0.125 inches and about 16 inches, and/or a width of between about 1 inch and about 16 feet, and/or a length of between about 1 inch and about 100 feet. One skilled in the art will appreciate, however, that the dimensions of such a planar cellulose product may vary considerably, and that the ranges recited above are for exemplary purposes only. In still other aspects, the cellulose product 800 may be formed as a sheet having a desired length, width, and thickness; or as a continuous sheet that is later subdivided into segments of a desired length, width, and/or thickness. In yet other aspects, the cellulose product 800, for example, a wallboard product, may be formed as discrete sheets having dimensions similar to that of conventional drywall. For instance, in some aspects, the cellulose product 800, in the form of a wallboard product, may be formed as a 4 foot by 8 foot sheet, a 4 foot by 12 foot sheet, or a 4 foot by 16 foot sheet. Even further, discrete sheets of the cellulose product 800 may be formed with thickness, for example, of 4 inches, 6 inches, or 8 inches, such that the end product may be implemented, for instance, as pre-fabricated structural wall panels.

In some aspects, a forming device (not shown) may be configured to engage the cellulose product 800 with one of a negative die and a positive die, so as to form a cellulose product having a surface defining a negative impression of the one of the negative die and the positive die. That is, for example, a platen may be appropriately patterned with a raised and/or depressed pattern such that the formed cellulose product will have a corresponding surface defining a negative impression of the pattern. One skilled in the art will also appreciate that the capability of manipulating the cellulose product 800 in this manner indicates that the final form of the cellulose product need not necessarily be in planar form, but may take many different shapes, contours, and sizes in addition to that disclosed herein.

In addition, in some aspects, the as-formed cellulose product 800 may be further processed, for example, to remove "broke" or otherwise planarize the edges of the cellulose product. In such instances, the apparatus 100 may also include a collection device (not shown), wherein the collection device may be configured to capture waste solids from the post-formation processing of the cellulose product 800. In those instances, the captured waste solids may be incorporated into other products (i.e., blown-in insulation) while providing fire-resistance properties therefor.

Many modifications and other aspects of the disclosures set forth herein will come to mind to one skilled in the art to which these disclosures pertain having the benefit of the teachings presented in the foregoing descriptions and the associated drawings. For example, one skilled in the art that the apparatuses disclosed herein readily lead to associated processes and methods for forming a fire resistant cellulose product. More particularly, one skilled in the art will appreciate that, in some aspects, the fiber mixture and/or cellulose product may be formed as a general cellulose element that can then be formed, molded, or otherwise manipulated into various end products such as, for example, boards, wallboards, structural wall panels, compound roofing shingles, compound roofing shakes, compound sidewall shingles, compound Spanish style "red clay" type roof tiles, electrical outlet encasements, doors, interior wall planking, exterior sheathing, cabinetry cores, cupboards, compounded cabinet door faces, flooring, laminated flooring, veneered compounded flooring, or the like. However, the exemplary end products presented herein are not intended to be limiting in any manner with respect to the wide variety of contemplated end products. Thus, the general cellulose element concept may be extend to instances where the end product may be produced in many different manners such as, for example, by molding, extrusion, pressing, stamping, or by any other suitable production method.

Moreover, the general cellulose element concept may be applicable where the general cellulose element is provided as a component or other portion of a further end assembly. Particularly, as shown in such previous examples as laminated flooring and cored cabinetry, the general cellulose element incorporating the fire-retarding solution forms a component of the end assembly. One skilled in the art will thus appreciate that cellulose products in accordance with aspects of the present disclosure may be produced such that the fire-retarding solution is dispersed at least partially, if not consistently and uniformly, throughout. As such, the components of the end assembly comprising the fire-retarded cellulose product may likely be wholly resistant to fire and/or unable to ignite on a more permanent basis (i.e., since the fire-retarding solution is effectively integrated into the cellulose product), as compared to simple surface treatments that may be easily removed, washed away, or subject to degradation over time.

Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming a fire resistant cellulose paperboard product, said method comprising:
    forming a cellulose fiber mixture, wherein the cellulose fiber mixture consists of fibers, an aqueous fire-retarding solution, and a bonding agent, wherein the fibers in the cellulose fiber mixture consist of refined cellulose fibers, wherein the fire-retarding solution and the bonding agent are substantially uniformly distributed with respect to the refined cellulose fibers in the cellulose fiber mixture, and wherein the aqueous fire-retarding solution comprises one of a boron compound, a borate, a bromine compound, aluminum hydroxide, magnesium hydroxide, hydromagnesite, antimony trioxide, a phosphonium salt, ammonium phosphate, diammonium phosphate, and combinations thereof;
    exposing the cellulose fiber mixture to an actuating element, the actuating element being configured to actuate the bonding agent so as to facilitate cohesion of the refined cellulose fibers having the fire-retarding solution distributed therein and to form the cellulose fiber mixture into a cellulose fiber board member, the cellulose fiber board member having opposing major surfaces; and
    engaging a cellulose sheet member with each of the major surfaces of the cellulose fiber board member, such that each cellulose sheet member substantially covers the respective major surface.

2. A method according to claim 1, further comprising drying the cellulose fiber mixture, prior to exposing the dried cellulose fiber mixture to the actuating element.

3. A method according to claim 2, further comprising depositing the dried cellulose fiber mixture into a mold arrangement prior to exposing the dried cellulose fiber mixture to the actuating element.

4. A method according to claim 1, wherein forming a cellulose fiber mixture further comprises forming a cellulose fiber mixture, wherein the cellulose fiber mixture consists of fibers, an aqueous fire-retarding solution, and a bonding agent, wherein the fibers in the cellulose fiber mixture consist of refined cellulose fibers, and wherein the bonding agent is one of an adhesive resin and a wax.

5. A method according to claim 1, wherein forming a cellulose fiber mixture further comprises forming a cellulose fiber mixture, wherein the cellulose fiber mixture consists of fibers, an aqueous fire-retarding solution, and a bonding agent, wherein the fibers in the cellulose fiber mixture consist of refined cellulose fibers, and wherein the bonding agent is methylene diphenylene diisocyanate (MDI).

6. A method according to claim 1, wherein exposing the cellulose fiber mixture to an actuating element further comprises exposing the cellulose fiber mixture to an actuating element comprising one of heat, heated humid air, steam, microwave energy, and infrared energy.

7. A method according to claim 1, wherein exposing the cellulose fiber mixture to an actuating element further comprises exposing the cellulose fiber mixture to an actuating element to form the cellulose fiber mixture into the cellulose fiber board member, wherein the cellulose fiber board member includes between about 2% and about 30% solids content of each of the fire-retarding solution and the bonding agent.

8. A method according to claim 1, further comprising refining one of raw wood pulp, palm tree waste, waste fiber, waste paper, and waste board, to form the refined cellulose fibers for the cellulose fiber mixture.

9. A method according to claim 1, wherein engaging a cellulose sheet member with each of the major surfaces of the cellulose fiber board member further comprises engaging a cellulose sheet member, comprising one of an encasement paper sheet member, a medium density fiber (MDF) board sheet member, and an oriented strand board (OSB) sheet member, with each of the major surfaces of the cellulose fiber board member, such that each cellulose sheet member substantially covers the respective major surface.

10. A method according to claim 1, wherein engaging a cellulose sheet member with each of the major surfaces of the cellulose fiber board member further comprises engaging a cellulose sheet member with each of the major surfaces of the cellulose fiber board member, using one of a resin material and an adhesive material disposed between each cellulose sheet member and the corresponding major surface.

11. A method according to claim 1, wherein forming a cellulose fiber mixture further comprises forming a cellulose fiber mixture, wherein the cellulose fiber mixture consists of fibers, an aqueous fire-retarding solution, and a bonding agent, wherein the fibers in the cellulose fiber mixture consist of refined cellulose fibers, and wherein the aqueous fire-retarding solution is one of a nontoxic fire-retarding solution and a neutral pH fire-retarding solution.

\* \* \* \* \*